(12) United States Patent
Okada et al.

(10) Patent No.: US 6,583,719 B2
(45) Date of Patent: Jun. 24, 2003

(54) SETTING APPARATUS AND SETTING METHOD EACH FOR SETTING SETTING INFORMATION IN ELECTRIC POWER LINE CARRIER COMMUNICATION TERMINAL APPARATUS

(75) Inventors: Yukio Okada, Kadoma (JP); Kenji Kuniyoshi, Kadoma (JP); Yoshiyuki Komoda, Kadoma (JP)

(73) Assignee: Matsushita Electric Works, Ltd., Kadoma (JP)

( * ) Notice: Subject to any disclaimer, the term of this patent is extended or adjusted under 35 U.S.C. 154(b) by 82 days.

(21) Appl. No.: 09/878,363

(22) Filed: Jun. 12, 2001

(65) Prior Publication Data

US 2002/0065583 A1 May 30, 2002

(30) Foreign Application Priority Data

Nov. 30, 2000 (JP) .................................. 2000-366285

(51) Int. Cl.7 ............................................. H04M 11/04
(52) U.S. Cl. ............................ 340/310.01; 340/310.06; 340/310.08; 340/825.72
(58) Field of Search .................. 340/310.01, 310.06, 340/310.07, 310.08, 825.69, 825.72; 375/259, 211

(56) References Cited

U.S. PATENT DOCUMENTS

| | | | | |
|---|---|---|---|---|
| 4,467,314 A | * | 8/1984 | Weikel et al. | 340/310 A |
| 4,755,792 A | * | 7/1988 | Pezzolo et al. | 340/538 |
| 5,097,249 A | * | 3/1992 | Yamamato | 340/340 CP |
| 6,281,784 B1 | * | 8/2001 | Redgate et al. | 340/310.01 |

FOREIGN PATENT DOCUMENTS

JP      58-148534       9/1983

* cited by examiner

Primary Examiner—Daniel J. Wu
Assistant Examiner—Phung Nguyen
(74) Attorney, Agent, or Firm—Oblon, Spivak, McClelland, Maier & Neustadt, P.C.

(57) ABSTRACT

A setting apparatus and a setting method are provided for setting setting information including attribute information and interlocking operation information into an electric power line carrier communication terminal apparatus equipped with an electric power line carrier communication section for performing electric power line carrier communication through an electric power line of a commercial electric power source. The setting information is previously stored in a data storage memory, and an infrared transmitting section transmits the setting information stored in the data storage memory, directly to the electric power line carrier communication terminal apparatus using an infrared communication method.

11 Claims, 13 Drawing Sheets

FIRST PREFERRED EMBODIMENT

Fig.1 FIRST PREFERRED EMBODIMENT

*Fig.6* MODIFIED PREFERRED EMBODIMENT
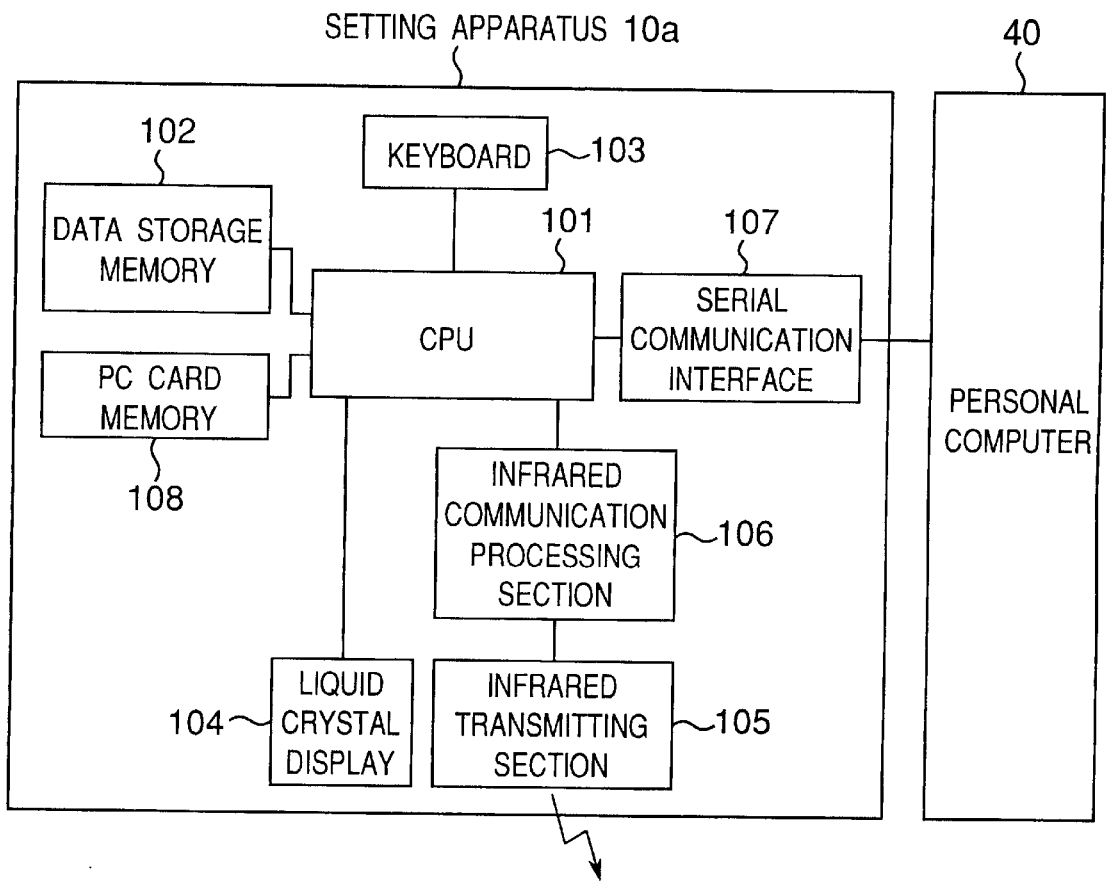
*Fig.7* PRIOR ART
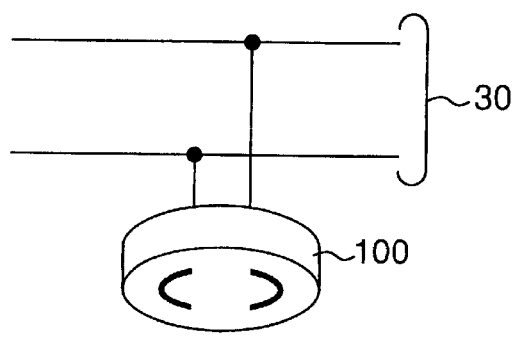

Fig. 8 SECOND PREFERRED EMBODIMENT

Fig.12 THIRD PREFERRED EMBODIMENT

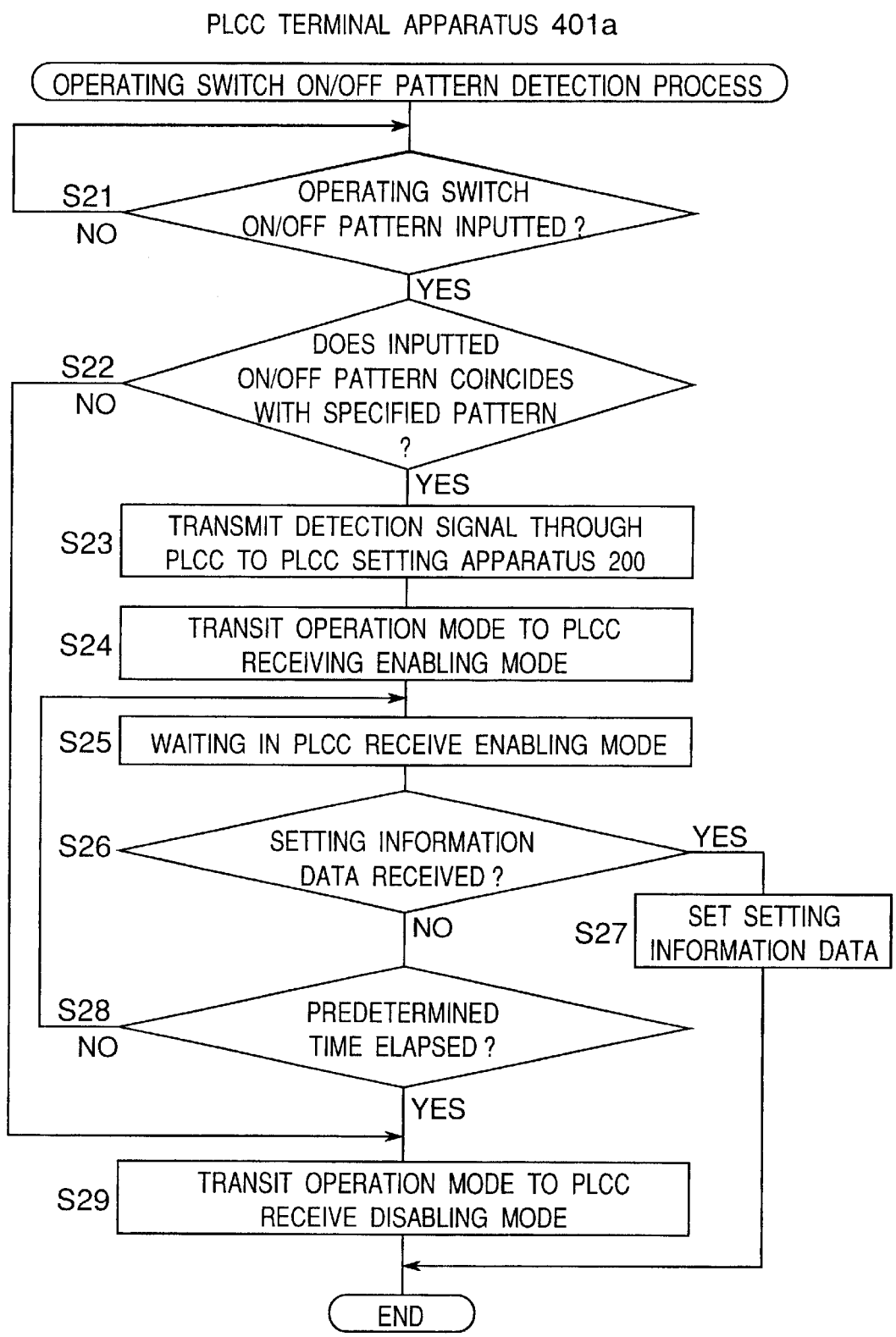

SETTING APPARATUS AND SETTING METHOD EACH FOR SETTING SETTING INFORMATION IN ELECTRIC POWER LINE CARRIER COMMUNICATION TERMINAL APPARATUS

BACKGROUND OF THE INVENTION

1. Field of the Invention

The present invention relates to a setting apparatus and a setting method each for setting setting information in an electric power line carrier communication terminal apparatus, and in particular, to a setting apparatus and a setting method each for setting setting information including attribute information and interlocking operation information into an electric power line carrier communication terminal apparatus equipped with electric power line carrier communication means for performing electric power line carrier communication through an electric power line of a commercial electric power source.

2. Description of the Related Art

Conventionally, there have been available electric power line carrier communication terminal apparatuses which are of three kinds of followings installed in a distributed manner in a building such as a house or the like:

(a) a first electric power line carrier communication terminal apparatus, provided between an electric power line of a commercial electric power source and an electric power load apparatus, and controlling an operation of the electric power load apparatus;

(b) a second electric power line carrier communication terminal apparatus, included in the electric power load apparatus, connected to the electric power line, and controlling an operation of the electric power load apparatus; and (c) a third electric power line carrier communication terminal apparatus, connected to the electric power line, and remotely performing control operation for one of the first and second electric power line carrier communication terminal apparatuses so as to be interlocked using the electric power line carrier communication means.

In this case, the above electric power load apparatuses are, for example, light equipments, air conditioners, or the like. It has been well known to those skilled in the art that unique attribute information such as an address for specifying such an electric power line carrier communication terminal is set using DIP switches provided to each electric power line carrier communication terminal apparatus.

There has been further available a polling and selecting type electric power line carrier communication system, which is capable of operating a plurality of electric power line carrier communication terminal apparatuses with a single main apparatus thereof, and which can communicate using multi-channels. In this case, when attribute data of attribute information such as an address, a terminal name, an installment place and the others are set to each of the electric power line carrier communication terminal apparatuses, a setting operation for writing the attribute data in a data storage memory provided to the each electric power line carrier communication terminal apparatus is performed by power line carrier communication (referred to as a PLCC hereinafter) via of an electric power line of a commercial electric power source using a dedicated setting apparatus or setting means provided in the main apparatus. That is, a system setting method has been proposed as follows. Each of electric power line carrier communication terminal apparatuses has information such as a kind, a mode number and the others of each product (such as a refrigerator, a television set or the like), the data of each of the electric power line carrier communication terminal apparatuses connected to the electric power line is acquired as a list with setting means or the like by the PLCC, and a desired electric power line carrier communication terminal apparatus is selected from the terminal listing data to set the attribute information such as an address and an installment place to the same terminal apparatus.

In the prior art technique, however, in the above-mentioned system setting technique using DIP switches, a trouble may be caused due to setting error in the case of a great number of terminal apparatuses, for example. On the other hand, the system setting technique of polling and selecting type has difficulty in identification in a case of a plurality of electric power line carrier communication terminal apparatuses of the same kind and the same model number. That is, when electric power line carrier communication terminal apparatuses are electric power load apparatuses each of a home electrical appliance such as a refrigerator, a television set, or the like, the electric power load apparatuses have to be connected one by one to the electric power line upon setting attribute information thereto. On the other hand, when an electric power line carrier communication terminal is either (a) a PLCC terminal apparatus such as a wall-installed operating switch terminal which comprises an operating switch for turning on and off a lighting equipment or (b) a wiring equipment type PLCC terminal apparatus such as a plug-in connection type load terminal apparatus having a plug socket for an electric power load apparatus such as a ceiling adapter for lighting equipment, then these PLCC terminal apparatuses can not be easily connected to the electric power line of the commercial electric power. For this reason, in the latter case, a setting operation of attribute information should be collectively performed after installment of the electric power line carrier communication terminal apparatuses instead of the setting operation thereof prior to each installment.

In the case of wiring equipment type electric power line carrier communication terminal apparatuses, generally the terminal apparatuses of the same kind and the same model number are installed. That is, in a lighting system composed of a plurality of operating switch terminal apparatuses installed on wall surfaces, and lighting apparatuses or ceiling adapter terminal apparatuses 100 as shown in FIG. 5 which are the plug-in connection type load terminal apparatuses, setting information for interlocking operation between each operating switch and a lighting equipment or a plug-in connection type load terminal apparatus can be set as follows. First of all, terminal listing data of load apparatuses (not shown) connected to the electric power line, plug-in connection type load terminal apparatuses and operating switch type terminal apparatuses (not shown) is obtained by PLCC via the electric power line using the setting means, followed by setting of interlocking operation by specifying a relationship between a desired operating switch type terminal apparatus and a load apparatus such as a lighting equipment. However, since there exist a plurality of operating switch terminal apparatuses of the same kind and the same model number, and a plurality of numbers of plug-in connection type load terminal apparatuses of the same kind and the same model number, and this leads to difficulty in physically specifying which operating switch terminal apparatus is installed where, or which plug-in connection load terminal is to be operated by an operating switch.

In order to dissolve the above-mentioned problems, a certain measure of solution can be achieved by providing a unique ID information to each of operating switch type terminal apparatuses and each of plug-in connection type load terminal apparatuses upon shipping from factories, and by managing installation places when executing construction work to specify the place of each terminal apparatus. However, actual management of the installation places could be realized at much expense in time and much effort at a building site in a disorderly situation. Further, it can be considered that unique ID information of an operating switch type terminal apparatus is displayed on an operating switch terminal apparatus using display means such as a bar code, which is read by a bar-code reader. In this case, however, it is hard in terms of product design to provide such a display on a product surface since a plug-in connection type load terminal apparatus of a wiring adapter type requires a relatively small size. On the other hand, when such a display is provided on a side surface or a rear surface of a product, the display results in being hidden within a wall and in order to avoid this, it is also expected that installment arrangement becomes more complex for the plug-in connection type load terminal apparatuses. In addition, when electric power line carrier communication terminal apparatuses exist with setting of the same address among neighboring houses, belonging to respective different electric power wiring systems, it is also conceived that setting information such as wrong interlocking operations or the like may be written.

SUMMARY OF THE INVENTION

An essential object of the present invention is therefore to provide a setting apparatus and a setting method each for setting setting information in an electric power line carrier communication terminal apparatus, each being capable of setting of setting information including attribute information and interlocking operation information without any confusion in relation with neighboring houses.

Another object of the present invention is to provide a setting apparatus and a setting method each for setting setting information in an electric power line carrier communication terminal apparatus, each being capable of setting of easily obtaining a relationship between a pair of PLCC terminal apparatuses which should be interlocked to each other, and capable of setting information including attribute information and interlocking operation information correctly even though the PLCC terminal apparatuses have the same type and the same model number.

In order to achieve the aforementioned objective, according to one aspect of the present invention, there is provided a setting apparatus for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the followings:
(a) a first electric power line carrier communication terminal apparatus, provided between the electric power line of the commercial electric power source and an electric power load apparatus, and controlling an operation of the electric power load apparatus;
(b) a second electric power line carrier communication terminal apparatus, included in the electric power load apparatus, connected to the electric power line, and controlling an operation of the electric power load apparatus; and
(c) a third electric power line carrier communication terminal apparatus, connected to the electric power line, and remotely performing control operation for one of the first and second electric power line carrier communication terminal apparatuses so as to be interlocked using the electric power line carrier communication means, wherein the setting apparatus comprises:
storage means for previously storing the setting information; and
infrared communication means for transmitting the setting information stored in the storage means, directly to the electric power line carrier communication terminal apparatus using an infrared communication method.

In the above-mentioned setting apparatus, the setting information preferably further includes a control program for use in operating the electric power load apparatus using the control program, and wherein the setting apparatus further comprises input means for inputting the setting information.

In the above-mentioned setting apparatus, the input means is preferably an interface circuit capable of being connected to a personal computer.

In the above-mentioned setting apparatus, the storage means is preferably a removable storage medium.

According to another aspect of the present invention, there is provided a setting method for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the followings:
(a) a first electric power line carrier communication terminal apparatus, provided between the electric power line of the commercial electric power source and an electric power load apparatus, and controlling an operation of the electric power load apparatus;
(b) a second electric power line carrier communication terminal apparatus, included in the electric power load apparatus, connected to the electric power line, and controlling an operation of the electric power load apparatus; and
(c) a third electric power line carrier communication terminal apparatus, connected to the electric power line, and remotely performing control operation for one of the first and second electric power line carrier communication terminal apparatuses so as to be interlocked using the electric power line carrier communication means, wherein the setting method includes the steps of:
previously storing the setting information into storage means; and
transmitting the setting information stored in the storage means, directly to the electric power line carrier communication terminal apparatus using an infrared communication method.

According to a further aspect of the present invention, there is provided a setting apparatus for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the followings:
(a) a first electric power line carrier communication terminal apparatus, provided between the electric power line of the commercial electric power source and an electric power load apparatus, and controlling an operation of the electric power load apparatus;
(b) a second electric power line carrier communication terminal apparatus, included in the electric power load apparatus, connected to the electric power line, and controlling an operation of the electric power load apparatus; and
(c) a third electric power line carrier communication terminal apparatus, connected to the electric power line, and remotely performing control operation for one of the first and second electric power line carrier communication terminal apparatuses so as to be interlocked using the electric power line carrier communication means, wherein the setting apparatus comprises:
first receiving means for receiving terminal identification information and terminal attribute information of each of a plurality of electric power line carrier communication terminal apparatuses by performing communications with a plurality of electric power line carrier communication terminal apparatuses using the electric power line carrier communication means;
first display means for displaying the received terminal identification information and terminal attribute information of each of a plurality of electric power line carrier communication terminal apparatuses for each of a plurality of electric power line carrier communication terminal apparatuses;
second receiving means for receiving a detection signal including the terminal identification information transmitted from each of a plurality of electric power line carrier communication terminal apparatuses in response to a predetermined position specifying signal;
second display means for displaying the terminal identification information and terminal attribute information of an electric power line carrier communication terminal apparatus corresponding to the received detection signal;
input means for inputting setting information including attribute information and interlocking operation information of the electric power line carrier communication terminal apparatus which are displayed; and
transmission setting means for setting the setting information into an electric power line carrier communication terminal apparatus corresponding to the detection signal by transmitting the inputted setting information to the electric power line carrier communication terminal apparatus corresponding to the detection signal using the electric power line carrier communication means.

In the above-mentioned setting apparatus, the position specifying signal is preferably an infrared signal from an infrared signal transmitter.

In the above-mentioned setting apparatus, the position specifying signal is a pattern signal generated by turning on and off an operating switch.

According to a still further aspect of the present invention, there is provided a setting method for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the followings:
(a) a first electric power line carrier communication terminal apparatus, provided between the electric power line of the commercial electric power source and an electric power load apparatus, and controlling an operation of the electric power load apparatus;
(b) a second electric power line carrier communication terminal apparatus, included in the electric power load apparatus, connected to the electric power line, and controlling an operation of the electric power load apparatus; and
(c) a third electric power line carrier communication terminal apparatus, connected to the electric power line, and remotely performing control operation for one of the first and second electric power line carrier communication terminal apparatuses so as to be interlocked using the electric power line carrier communication means, wherein the setting method includes the steps of:
receiving terminal identification information and terminal attribute information of each of a plurality of electric power line carrier communication terminal apparatuses by performing communications with a plurality of electric power line carrier communication terminal apparatuses using the electric power line carrier communication means;
displaying the received terminal identification information and terminal attribute information of each of a plurality of electric power line carrier communication terminal apparatuses for each of a plurality of electric power line carrier communication terminal apparatuses;
receiving a detection signal including the terminal identification information transmitted from each of a plurality of electric power line carrier communication terminal apparatuses in response to a predetermined position specifying signal;
displaying the terminal identification information and terminal attribute information of an electric power line carrier communication terminal apparatus corresponding to the received detection signal;
inputting setting information including attribute information and interlocking operation information of the electric power line carrier communication terminal apparatus which are displayed; and
setting the setting information into an electric power line carrier communication terminal apparatus corresponding to the detection signal by transmitting the inputted setting information to the electric power line carrier communication terminal apparatus corresponding to the detection signal using the electric power line carrier communication means.

In the above-mentioned setting method, the position specifying signal is preferably an infrared signal from an infrared signal transmitter.

In the above-mentioned setting method, the position specifying signal is preferably a pattern signal generated by turning on and off an operating switch.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 is a schematic block diagram showing a detailed configuration of a setting apparatus 10a of a modified preferred embodiment;

FIG. 7 is a schematic perspective view of a conventional sealing adapter 100;

FIG. 14 is a flowchart showing an operating switch ON/OFF pattern detection process which is executed by a CPU 2a of the PLCC terminal apparatus 401a shown in FIG. 13.

DETAILED DESCRIPTION OF THE PREFERRED EMBODIMENTS

Preferred embodiments according to the present invention will be described below with reference to the attached drawings. In the following Figures, components similar to each other are indicated by the same numeral reference.

First Preferred Embodiment

Figure 1:
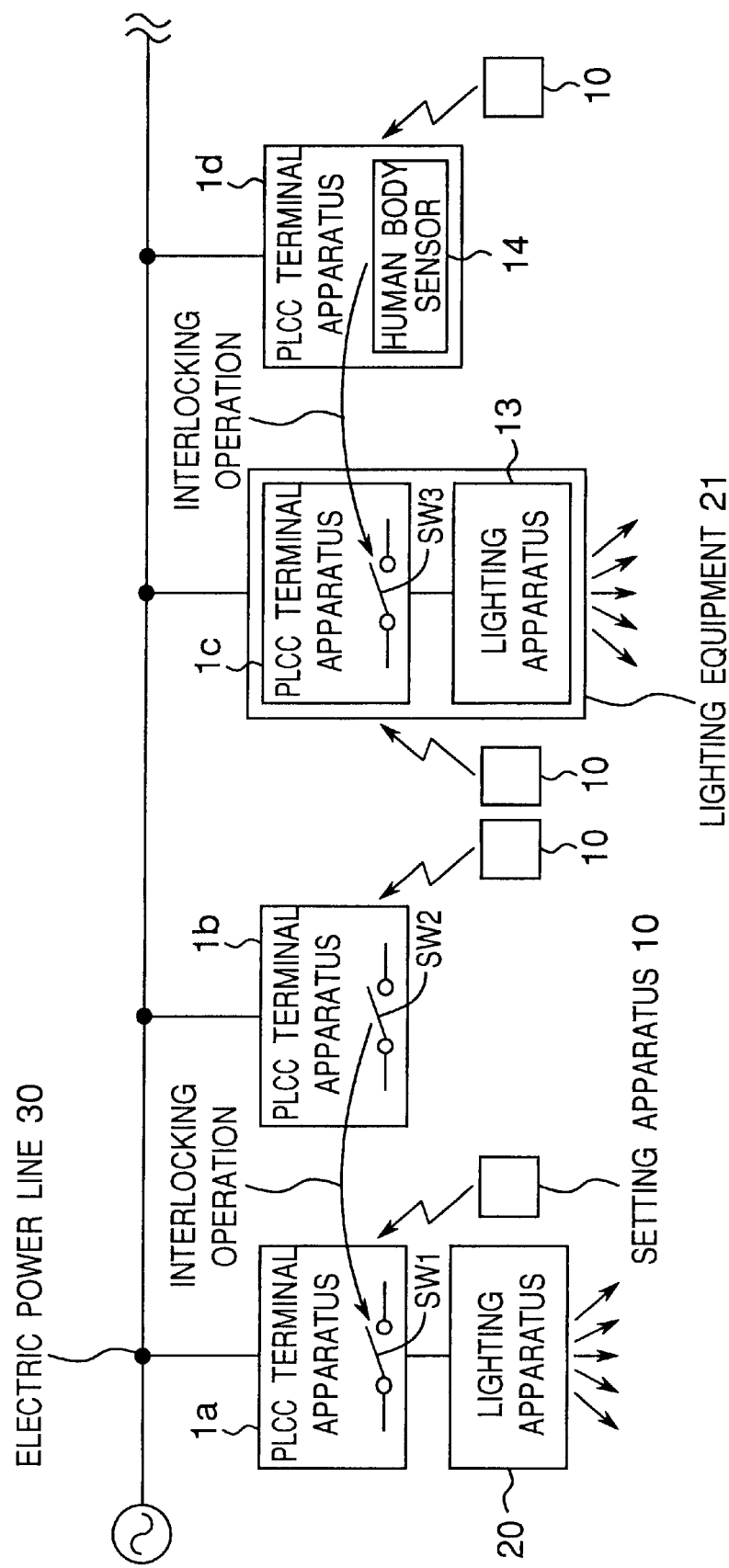
FIG. 1 is a schematic block diagram showing a configuration of an electric power line carrier communication system according to a first preferred embodiment of the present invention.

FIG. 1 is a schematic block diagram showing a configuration of an electric power line carrier communication system according to a first preferred embodiment of the present invention.

Referring to FIG. 1, there are provided four PLCC terminal apparatuses 1a, 1b, 1c and 1d and a setting apparatus 10. The setting apparatus 10 is provided for setting setting information including attribute information and interlocking operation information into the PLCC terminal apparatuses 1a, 1b, 1c and 1d each equipped with a PLCC modem 7 of PLCC communication means for performing PLCC through an electric power line 30 of a commercial electric power source. Each of the above-mentioned PLCC terminal apparatuses 1a, 1b, 1c and 1d is one of the followings:

(type A) a first PLCC terminal apparatus, provided between the electric power line 30 and an electric power load apparatus, and controlling an operation of the electric power load apparatus;

(type B) a second PLCC terminal apparatus, included in the electric power load apparatus, connected to the electric power line 30, and controlling an operation of the electric power load apparatus; and (type C) a third PLCC terminal apparatus, connected to the electric power line 30, and remotely performing control operation for one of the first and second PLCC terminal apparatuses so as to be interlocked using the PLCC modem 7.

In the example of FIG. 1, the PLCC terminal apparatus 1a is of type A, the PLCC terminal apparatuses 1c is of type B, and the PLCC terminal apparatuses 1b and 1d are of type C. The setting apparatus 10 of the first preferred embodiment is characterized in comprising not only a data storage memory 102 for previously storing the setting information including the attribute information and interlocking operation information, but also infrared transmitting section 105 for transmitting the setting information stored in the data storage memory 102, directly to each of the PLCC terminal apparatus 1a, 1b, 1c and 1d using an infrared communication method.

As shown in FIG. 1, the PLCC terminal apparatus 1a having a turning switch SW1 such as a ceiling adapter of FIG. 7 is provided between the electric power line 30 and the lighting apparatus 20 of an electric power load apparatus, and the PLCC terminal apparatus 1b having an operating switch SW2 is connected to the electric power line 30. After setting setting information including the attribute information and the interlocking operation information from the setting apparatus 10 through the infrared communication method to the PLCC terminal apparatuses 1a and 1b, if the operating switch SW2 is tuned on, then the turning switch SW1 is turned on. This is a first interlocking operation in this example.

Further, the lighting equipment 21 comprises the PLCC terminal apparatus 1c and the lighting apparatus 13, and the PLCC terminal apparatus 1c having a turning switch SW3 included in the lighting equipment 21 is provided between the electric power line 30 and the lighting apparatus 13 of an electric power load apparatus. The PLCC terminal apparatus 1d having a human body sensor 14 is connected to the electric power line 30. After setting setting information including the attribute information and the interlocking operation information from the setting apparatus 10 through the infrared communication method to the PLCC terminal apparatuses 1c and 1d, if the human body sensor 14 detects a human body in an area near the human body sensor 14 and is tuned on, then the turning switch SW3 is turned on. This is a second interlocking operation in this example.

Figure 2:
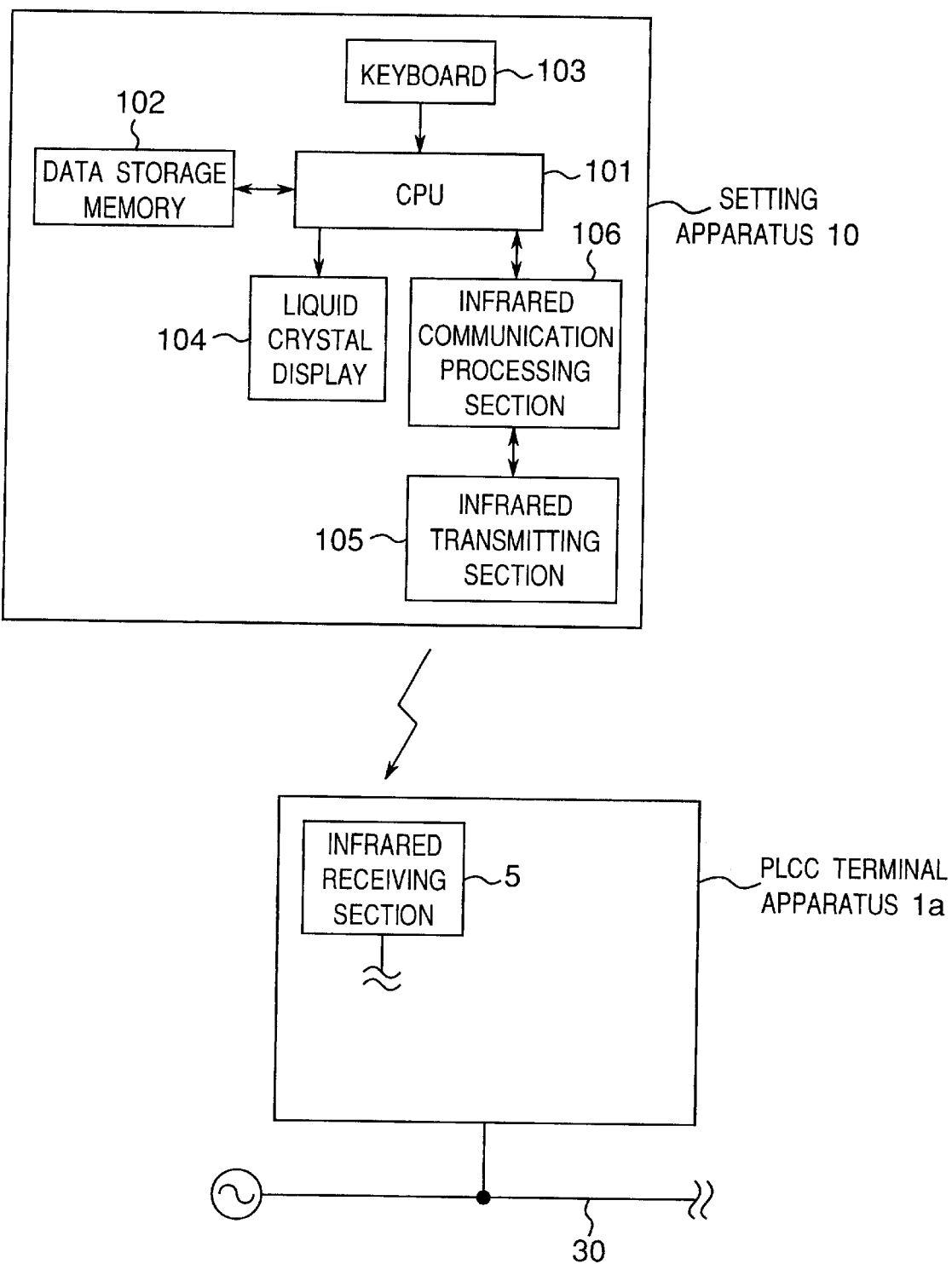
FIG. 2 is a schematic block diagram showing detailed configurations of a setting apparatus 10 and a PLCC terminal apparatus 1a shown in FIG. 1.

FIG. 2 is a schematic block diagram showing detailed configurations of the setting apparatus 10 and the PLCC terminal apparatus 1a shown in FIG. 1.

Referring to FIG. 2, the setting apparatus 10 is constituted by comprising a CPU 101, the data storage memory 102, a keyboard 103, a liquid crystal display 104, the infrared transmitting section 105, and an infrared communication processing section 106. The CPU 101 is provided for controlling the operation of the setting apparatus 10. The setting information including the attribute information and the interlocking operation information is inputted using the keyboard 103, and then, the setting information is written into the data storage memory 102 through the CPU 101, and is also displayed on the liquid crystal display 104. Upon setting the setting information, the user turns on a transmission key of the key board 103 after user's confirming the setting data displayed on the liquid crystal display 104, then the setting information is read out from the data storage memory 102 through the CPU 101 to the infrared communication processing section 106, which then converts the inputted setting information into a packet data signal. Thereafter, the infrared transmitting section 105 modulates an infrared signal according to the packet data signal from the infrared communication processing section 106, and transmits the same infrared signal toward, for example, an infrared receiving section 5 of the PLCC terminal apparatus 1*a*, as shown in FIG. 2.

Figure 3:
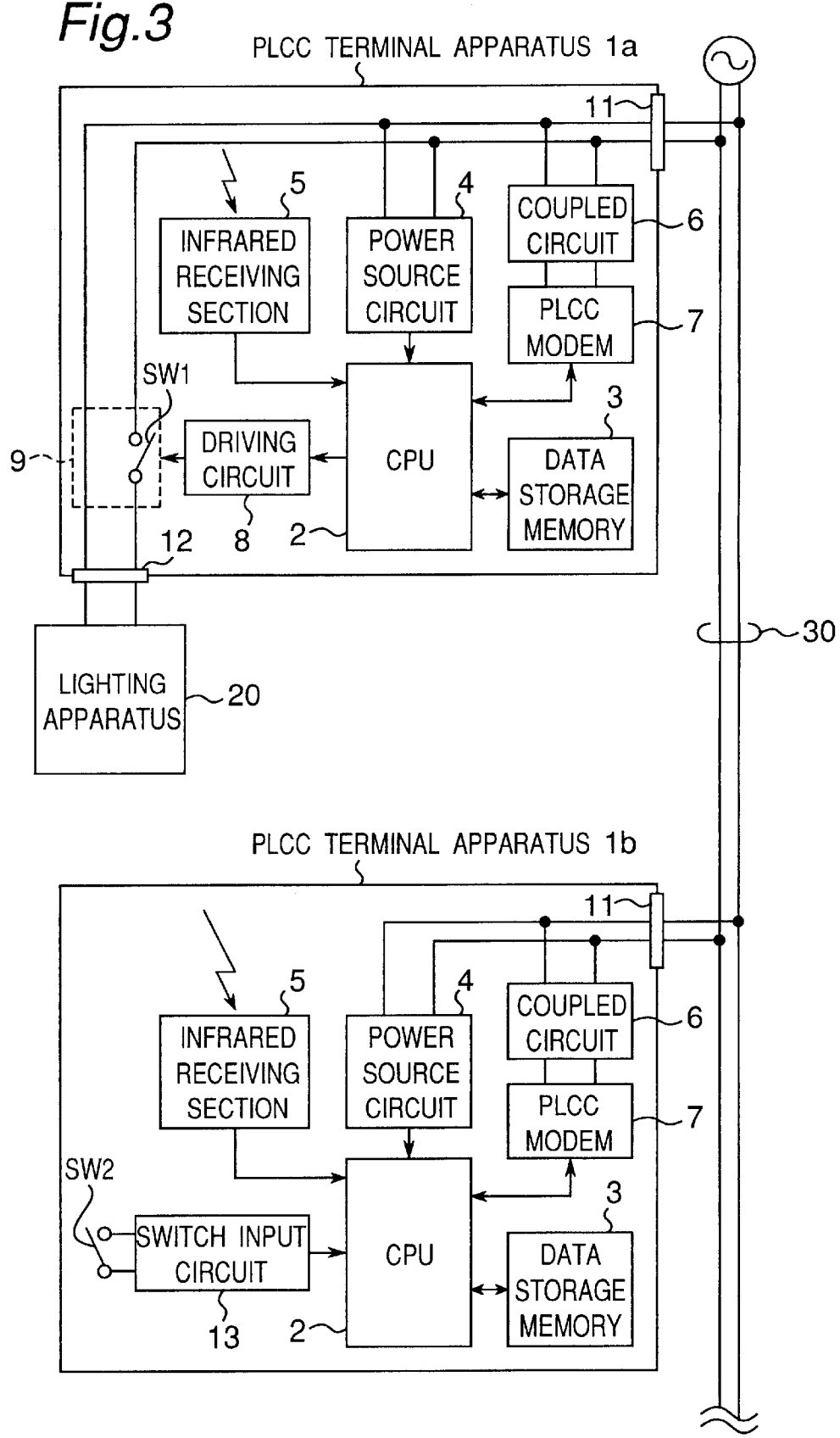
FIG. 3 is a schematic block diagram showing detailed configurations of PLCC terminal apparatuses 1a and 1b shown in FIG. 1.

FIG. 3 is a schematic block diagram showing detailed configurations of the PLCC terminal apparatuses 1*a* and 1*b* shown in FIG. 1.

Referring to FIG. 3, the PLCC terminal apparatus 1*a* is of, for example, a wall embeddable ceiling adapter in a form of a wiring adapter of FIG. 7, which is described in the description of the related art of this specification. The PLCC terminal apparatus 1*a* is constituted by comprising the followings:

(a) a power source terminal 11 connected to the electric power line 30;

(b) a hook ceiling terminal 12 through which the lighting apparatus 20 is electrically connected in a form of hanging;

(c) a CPU 2 of a microcomputer for controlling the operation of the PLCC terminal apparatus 1*a*;

(d) a data storage memory 3 of an EEPROM or the like for writing setting information data including attribute information and interlocking operation information;

(e) a power source circuit 4 for converting an AC voltage from the electric power line 30 to a DC voltage and supplying the DC voltage to the CPU 2 and the other circuits;

(f) an infrared receiving section 5 for receiving an infrared signal from the setting apparatus 10, demodulating the received infrared signal into a packet data signal, and outputting the same data signal through the CPU 2 to the data storage memory 3;

(g) a coupled circuit 6 provided between th the electric power line 30 and a PLCC modem 7, and including a high-pass filter and an insulating transformer;

(h) the PLCC modem 7 for performing PLCC, concretely, transmitting a PLCC data signal from the CPU 2 through the electric power line 30 to another PLCC terminal apparatus, and receiving a PLCC data signal from another PLCC terminal apparatus through the electric power line 30;

(i) a driving circuit 8 for turning on and off the turning switch SW1 of a switch section 9; and (j) the switch section 9 having the turning switch SW1 connected between the electric power line 30 and the lighting apparatus 20.

It is to be noted that the infrared receiving section 5 receives an infrared signal from the infrared transmitting section 105 of the setting apparatus 10 and demodulates the received infrared signal into packet data signal including the setting information, which is then written into the data storage memory 3. Further, the PLCC signal includes an instruction signal, for example, from the PLCC terminal apparatus 1*b* for turning on and off the switch SW1.

Further, the PLCC terminal apparatus 1*b* is constituted by comprising the followings:

(a) the power source terminal 11 connected to the electric power line 30;

(b) the CPU 2 of a microcomputer for controlling the operation of the PLCC terminal apparatus 1*b*;

(c) the data storage memory 3 of an EEPROM or the like for writing setting information data including attribute information and interlocking operation information;

(d) the power source circuit 4 for converting an AC voltage from the electric power line 30 to a DC voltage and supplying the DC voltage to the CPU 2 and the other circuits;

(e) the infrared receiving section 5 for receiving an infrared signal from the setting apparatus 10, demodulating the received infrared signal into a packet data signal, and outputting the same data signal through the CPU 2 to the data storage memory 3;

(f) the coupled circuit 6 provided between th the electric power line 30 and the PLCC modem 7, and including a high-pass filter and an insulating transformer;

(g) the PLCC modem 7 for performing PLCC, concretely, transmitting a PLCC data signal from the CPU 2 through the electric power line 30 to another PLCC terminal apparatus, and receiving a PLCC data signal from another PLCC terminal apparatus through the electric power line 30;

(h) a switch input circuit 13 for receiving an on/off information of the operating switch SW2, and outputting the same information to the CPU 2.

In the case where an interlocking relationship is established between the operating switch 2 of the PLCC terminal apparatus 1*b* and the turning switch SW1 of the PLCC terminal apparatus 1*a*, if the operating switch SW2 is turned on, a PLCC signal including an instruction signal for turning on the turning switch SW1 is sent from the CPU 2 of the PLCC terminal apparatus 1*b* through the electric power line 30 to the CPU 2 of the PLCC terminal apparatus 1*a*, and in response to the PLCC signal including the instruction signal, the CPU 2 of the PLCC terminal apparatus 1*a* turns on the turning switch SW1 through the driving circuit 8.

Figure 4:
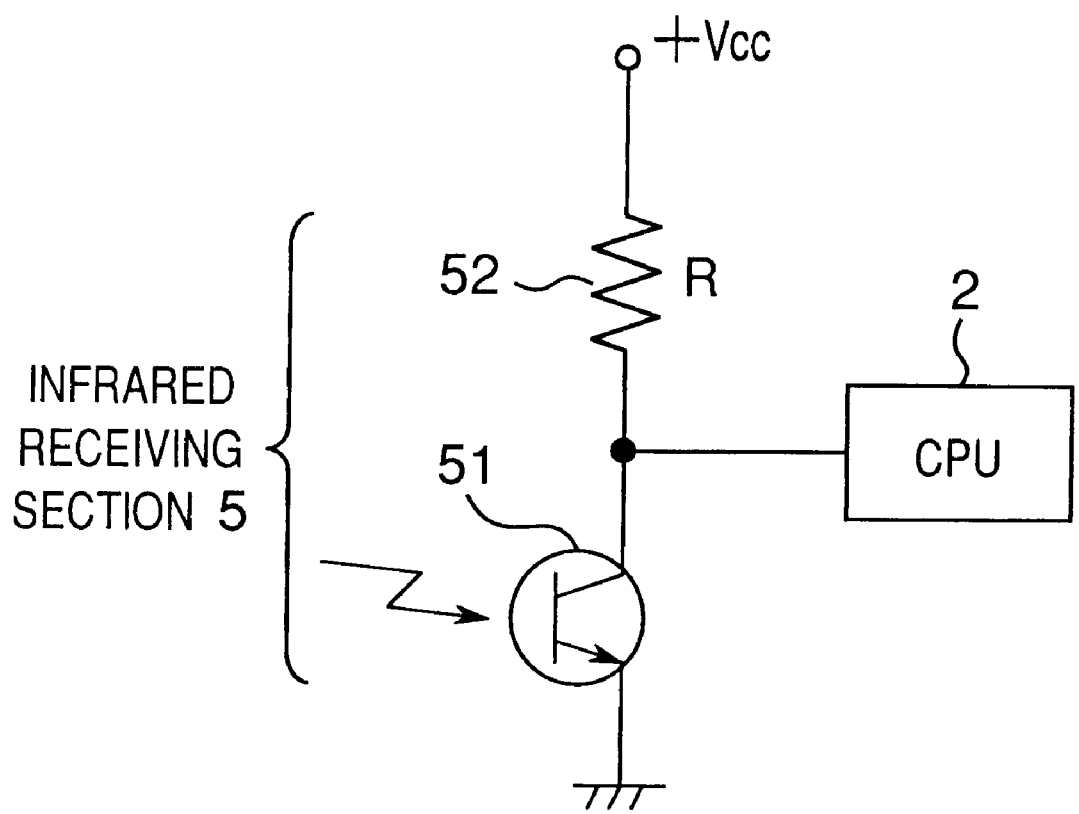
FIG. 4 is a schematic circuit diagram showing a configuration of an infrared receiving section 5 shown in FIGS. 2 and 3.

FIG. 4 is a schematic circuit diagram showing a configuration of the infrared receiving section 5 shown in FIGS. 2 and 3.

Referring to FIG. 4, the infrared receiving section 5 is constituted by comprising a voltage supply register (R) 52 and a phototransistor 51. In this case, a collector of the phototransistor 51 is directly connected to a serial communication input port of the CPU 2 for performing the infrared signal communication using the infrared signal. Therefore, the infrared receiving section 5 can be constructed of a small number of parts, which enables increase in cost due to addition of functions other than its basic function to be suppressed. It is to be noted that as communication means, it is also considered to use wireless communication means which is called low power wireless communication means or a Bluetooth communication means in stead of the infrared wireless communication means, however, cost reduction or limitation on communication between adjacent houses can be easily realized by the infrared communication means installed in the PLCC terminal apparatuses.

Figure 5:
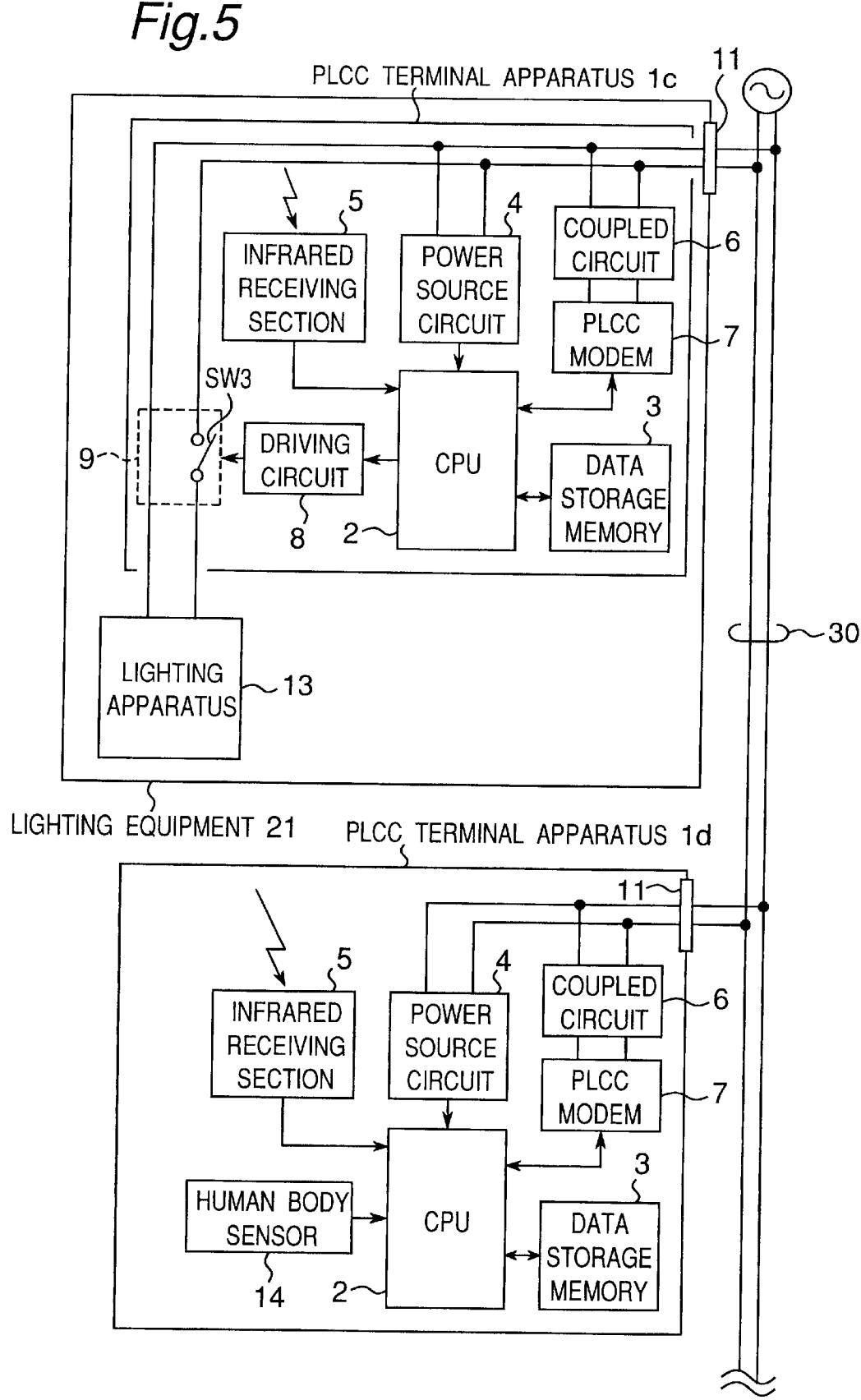
FIG. 5 is a schematic block diagram showing detailed configurations of PLCC terminal apparatuses 1c and 1d shown in FIG. 1.

FIG. 5 is a schematic block diagram showing detailed configurations of the PLCC terminal apparatuses 1c and 1d shown in FIG. 1.

Referring to FIG. 5, the lighting equipment 21 comprises the PLCC terminal apparatus 1c and the lighting apparatus 13, where the PLCC terminal apparatus 1c comprises the turning switch SW3 of the switch section 9. The other structure in the PLCC terminal apparatus 1c is similar to that of the PLCC terminal apparatus 1a shown in FIG. 3.

Further, the PLCC terminal apparatus 1d is characterized in comprising the human body sensor 14 in stead of the operating switch SW2 and the switch input circuit 13 as compared with the structure of the PLCC terminal apparatus 1b.

In the case where an interlocking relationship is established between the human body sensor 14 of the PLCC terminal apparatus 1d and the turning switch SW3 of the PLCC terminal apparatus 1c, if the human body sensor 14 detects a human body and is turned on, a PLCC signal including an instruction signal for turning on the turning switch SW3 is sent from the CPU 2 of the PLCC terminal apparatus 1d through the electric power line 30 to the CPU 2 of the PLCC terminal apparatus 1c, and in response to the PLCC signal including the instruction signal, the CPU 2 of the PLCC terminal apparatus 1c turns on the turning switch SW3 through the driving circuit 8.

In the preferred embodiment, the setting information preferably further includes a program operation data of control program. In this case, for example, the CPU 2 of the PLCC terminal apparatus 1c operates according to the program operation data of control program stored in the data storage memory 3, so as to control turning on and off of the switch SW3. The control program preferably includes various kinds of control patterns, for example, "going out mode", "sleeping mode", or the like.

In such a way, each of the PLCC terminal apparatuses 1a, 1b, 1c and 1d is subjected to writing of setting information including attribute information and interlocking operation information through infrared transmitting section 105 and the infrared receiving section 5 using the infrared communication method, and this leads to that system setting can be performed for each of PLCC terminal apparatuses 1a, 1b, 1c and 1d. Therefore, setting of setting information including address information, attribute information, interlocking operation information and others can be performed without causing any confusion in a relation with neighboring houses and furthermore. Since the setting is performed using infrared from the setting apparatus 10, a desired PLCC terminal apparatus can be physically specified even when there exist a plurality of PLCC terminal apparatuses with the same model number.

The setting of addresses as described above has only to be performed in communication system setting of a master/slave type in which a plurality of PLCC terminal apparatuses as described above are controlled by a single PLCC terminal operating apparatus, however, interlocking operations among the PLCC terminal apparatuses are required to be set in an automatic distributed system performing reciprocal communications in a n-to-n relationship among PLCC terminal apparatuses. In that case, interlocking setting data should be inputted through the keyboard 103 of the setting apparatus 10, and then, these data is transmitted to the PLCC terminal apparatuses to perform setting of interlocking operation information.

The electric power lines are branched to buildings such as a plurality of houses from the same pole transformer. Therefore, when an electric power line wired in a house is used as an information transmission path, there is a high possibility of leaking a transmission signal to a neighboring house. Therefore, generally it is necessary to encrypt communication data in the PLCC. In this case, a cipher key unique to an individual house is required, and further, it is necessary to set the same cipher key in common to all of PLCC terminal apparatuses used inside the house. When the cipher key is set by the PLCC, the cipher key itself may be leaked to neighboring houses, and this leads to that the security can not be maintained. According to the above described system setting method for the PLCC terminal apparatuses, no risk of leakage arises by inputting of the cipher key at the setting apparatus 10 and transmitting the same therefrom.

After setting of address data including the cipher key which is at least required in the PLCC, mutual communications between the PLCC terminal apparatuses can be effected by the PLCC. That is, setting of communication system such as setting of complex data can also be effected using the setting apparatus 10 by the PLCC in a prior art manner.

Further, a wiring adapter of a wall embeddable type which is the PLCC terminal apparatus 1a is subjected to write of attribute information resulting in attribute setting for the wiring adapter through the infrared communication provided to the wiring adapter to perform system setting, and therefore, the setting of address information, attribute information, interlocking operation information and the others can be effected without sacrificing compactness of the wiring adapter of wall embeddable type.

Furthermore, the program data can be set to the PLCC terminal apparatuses in addition to the setting information, and therefore, setting of interlocking operation information and programmed operation information among the PLCC terminal apparatuses can be performed by the setting apparatus 10 with good operability.

Modified Preferred Embodiment

FIG. 6 is a schematic block diagram showing a detailed configuration of a setting apparatus 10a of a modified preferred embodiment. As compared with the setting apparatus 10 shown in FIG. 2, the setting apparatus 10a of the present modified preferred embodiment is characterized in further comprising the followings:

(a) a serial communication interface which is connected with a personal computer 40 for inputting interlocking operation information among the PLCC terminal apparatuses and program data for program operation; and (b) a removable PC card memory 108 for storing setting information including attribute information, interlocking operation information, the program data or the like.

Referring to FIG. 6, the setting apparatus 10a includes the serial communication interface such as an RS-232C interface, a USB interface or the like, which is provided as data input section from the personal computer 40. In this case, data of setting information including attribute information, interlocking operation information, complex program data or the like which are prepared by the personal computer 40 are transmitted as input processing from the personal computer 40 through the serial communication interface 107 and the CPU 101 to the PC card memory 108 or the data storage memory 102.

For example, when inputting of setting data comparatively long in length such as attribute data and a cipher key, there is such a risk that a mistake may arises because of an excessive time consumed upon inputting from the keyboard 103, however, according to the modified preferred embodiment, inputting operation for setting data can also be simplified using the personal computer 40. It is noted that the serial communication interface 107 may be changed with an Ethernet interface, a telephone modem or the like.

In this case, the PC card memory 108 of a removable storage medium is inserted into a PC card slot of mounting means of the setting apparatus 10*a*. Each of the PC card memory 108 and the data storage memory 102 can be of a ROM or RAM. Since the removable PC card memory 108 is used, the system setting can be performed after confirming the data stored in the PC card memory 108, and also data for the system setting can be maintained at the other place. Further, data in new version for the system setting can be changed with the data in old version, using an off-line method.

In the first preferred embodiment, the human body sensor 14 is used, however, the other kind of sensor may be used.

According to the preferred embodiment of the present invention, setting of address information, attribute information, interlocking operation information and the others can be performed without any confusion in relation with neighboring houses.

Second Preferred Embodiment

Figure 8:
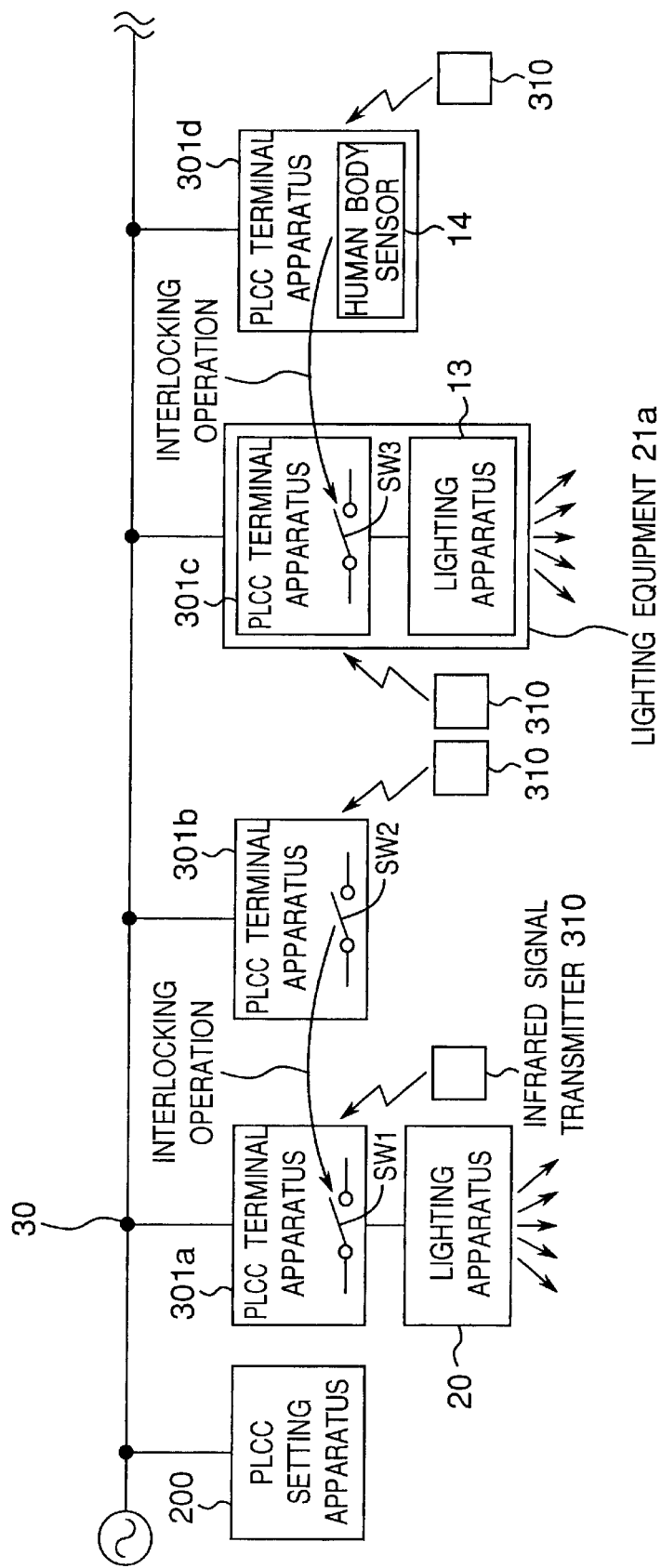
FIG. 8 is a schematic block diagram showing a configuration of an electric power line carrier communication system according to a second preferred embodiment of the present invention.

FIG. 8 is a schematic block diagram showing a configuration of an electric power line carrier communication system according to a second preferred embodiment of the present invention. As compared with the communication system of the first preferred embodiment shown in FIG. 1, the communication system of the second preferred embodiment is characterized in the followings:

(a) in order to specify the position of each of the PLCC terminal apparatuses 301*a*, 301*b*, 301*c* and 301*d*, namely, to specify the relationship between terminal information data which is listed in a terminal table and each of the PLCC terminal apparatuses 301*a*, 301*b*, 301*c* and 301*d* which is practically installed, an infrared signal transmitter 310 transmits an infrared signal toward each of the PLCC terminal apparatuses 301*a*, 301*b*, 301*c* and 301*d*, and then, each of the PLCC terminal apparatuses 301*a*, 301*b*, 301*c* and 301*d* transmits a detection signal to the PLCC setting apparatus 200 in response to the infrared signal; and (b) thereafter, the setting information data for PLCC system setting is transmitted from the PLCC setting apparatus 200 to each of the PLCC terminal apparatuses 301*a*, 301*b*, 301*c* and 301*d* through PLCC in a prior art manner.

In the arrangement shown in FIG. 8, it is noted that the PLCC terminal apparatuses 301*a*, 301*b*, 301*c* and 310*d* correspond to the PLCC terminal apparatuses 1*a*, 1*b*, 1*c* and 1*d* shown in FIG. 1, respectively.

It is to be noted that "terminal information data" including terminal identification information and terminal attribute information such as a serial number of ID, a manufacturer's name, a kind of machine, a model number is stored in a non-volatile memory (not shown) of each of the PLCC terminal apparatuses 301*a*, 301*b*, 301*c* and 310*d*.

Referring to FIG. 8, the PLCC setting apparatus 200 and the PLCC terminal apparatus 301*a*, 301*b*, 301*c* and 301*d* are connected with the electric power line 30. The PLCC terminal apparatus 301*a* having a turning switch SW1 is provided as a ceiling adapter between the lighting apparatus 20 and the electric power line 30, and the PLCC terminal apparatus 301*b* comprises an operating switch SW2 for instructing the turning switch SW1 to turn on in an interlocking operation manner. Further, a lighting equipment 21*a* is constituted by comprising the PLCC terminal apparatus 301*c* and the lighting apparatus 13, and the PLCC terminal apparatus 301*c* having a turning switch SW3 is provided between the lighting apparatus 13 and the electric power line 30. The PLCC terminal apparatus 301*d* comprises the human body sensor 14, and an interlocking operation is performed so that when the human body sensor 14 is turned on, the operating switch SW3 is turned on.

Figure 9:
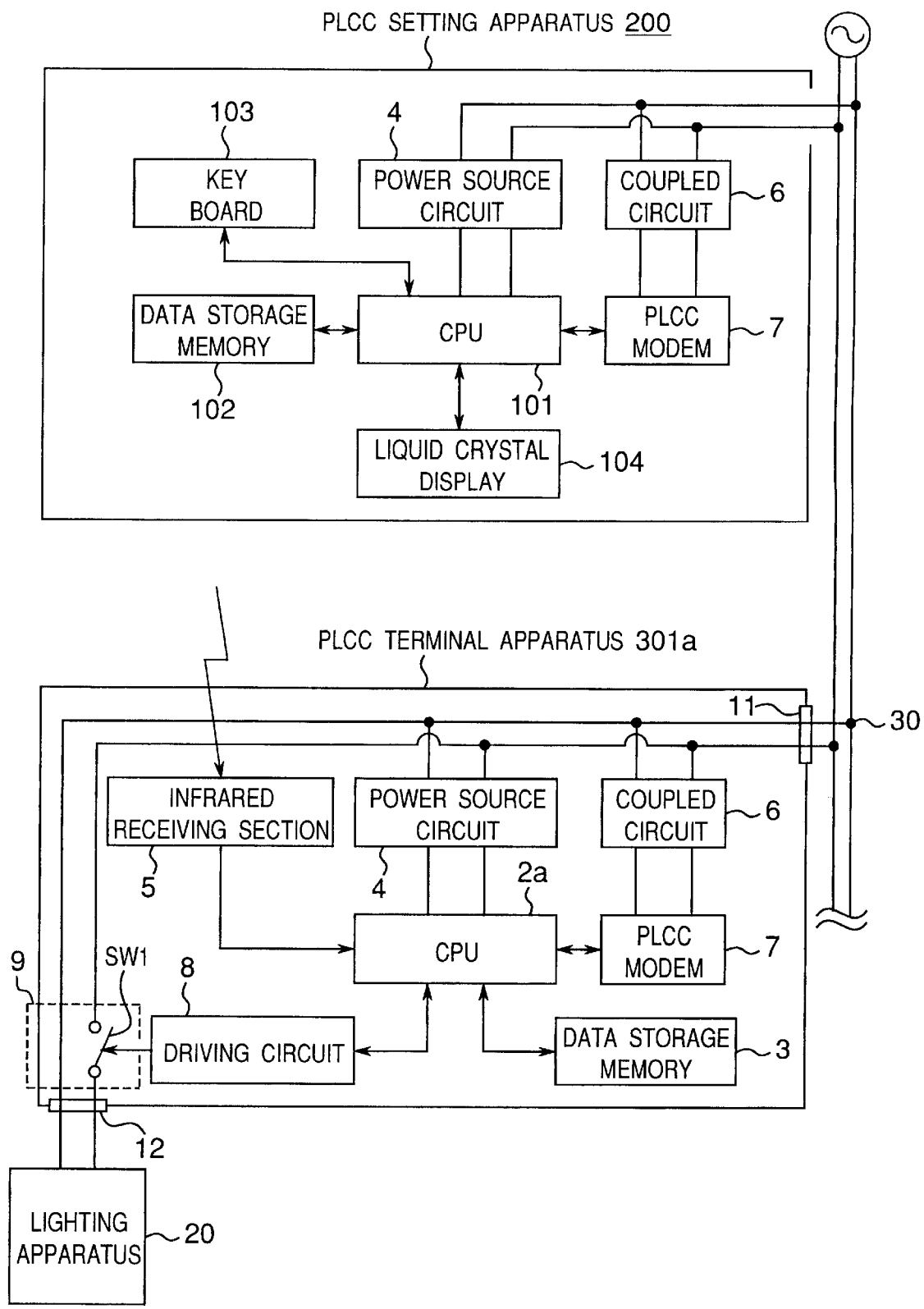
FIG. 9 is a schematic block diagram showing detailed configurations of a PLCC setting apparatus 200 and a PLCC terminal apparatus 301a shown in FIG. 8.

FIG. 9 is a schematic block diagram showing detailed configurations of the PLCC setting apparatus 200 and the PLCC terminal apparatus 301*a* shown in FIG. 8.

Referring to FIG. 9, the PLCC is constituted by comprising the CPU 101, the data storage memory 102, the keyboard 103, the liquid crystal display 104, the power source circuit 4, the coupled circuit 6 and the PLCC modem 7. The PLCC terminal apparatus 301*a* is constituted by comprising by a CPU 2*a*, the data storage memory 3, the power source circuit 4, the infrared receiving section 5 for receiving an infrared signal from the infrared signal transmitter 310, the coupled circuit 6, the PLCC modem 7, the driving circuit 8, the turning switch SW1 of the switch section 9, the power source terminal 11 and the hook ceiling terminal 12. In this arrangement, setting information data for system setting including attribute information, interlocking operation information and the like is transmitted through PLCC from the data storage memory 102 of the PLCC terminal apparatus 200 via the CPU 101, the PLCC modem 7, the coupled circuit 6, the electric power line 30, the coupled circuit 6, the PLCC modem 7, the CPU 2*a* to the data storage memory 3 of the PLCC terminal apparatus 301*a*.

Figure 10:
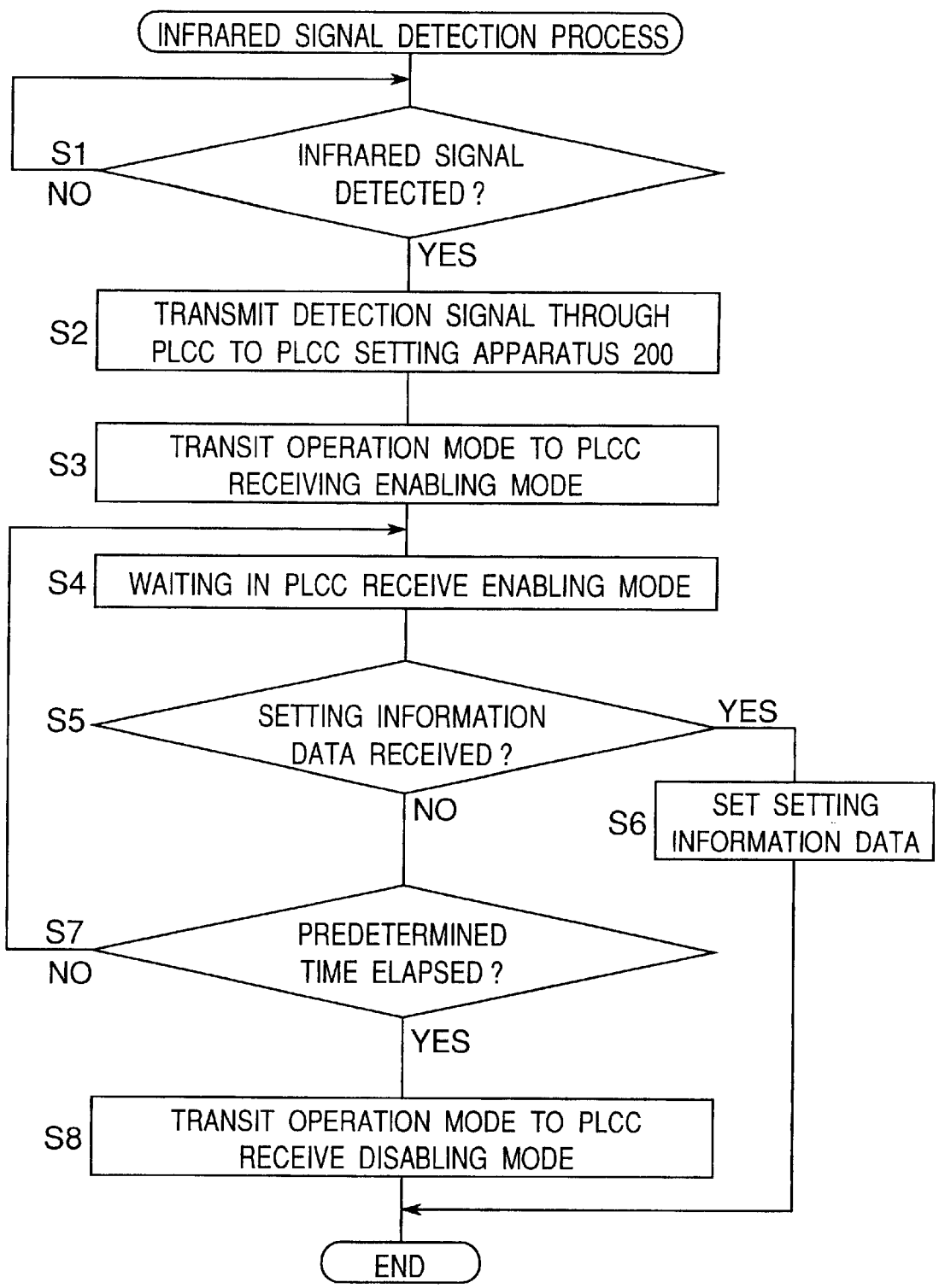
FIG. 10 is a flowchart showing an infrared signal detection process which is executed by a CPU 2a of the PLCC terminal apparatus 301a shown in FIG. 9.

FIG. 10 is a flowchart showing an infrared signal detection process which is executed by the CPU 2*a* of the PLCC terminal apparatus 301*a* shown in FIG. 9.

Referring to FIG. 10, first of all, it is judged at step S1 whether or not an infrared signal is detected by the infrared receiving section 5, and then, if NO at step S1, the program flow repeats the process of step S1. On the other hand, if YES at step S1, a detection signal is transmitted through PLCC to the PLCC setting apparatus 200 at step S2, and then, the operation mode of the CPU 2*a* is transited from a PLCC receiving disabling mode to a PLCC receiving enabling mode at step S3. Then the CPU 2*a* waits in the PLCC receive enabling mode at step S4, and it is judged at step S5 whether or not setting information data is received from the PLCC setting apparatus 200 through the PLCC modem 7. If NO at step S5, it is judged at step S7 whether or not a predetermined time has been elapsed from the beginning of the PLCC receive enabling mode. If NO at step S7, the program flow goes back to step S4. On the other hand, if YES at step S7, the program flow goes to step S8, and thereafter, the operation mode of the CPU 2*a* is transited from the PLCC receive enabling mode to the PLCC receive disabling mode, then the infrared signal detection process is completed. Further, if YES at step S5, the program flow goes to step S6, and then, the received setting information data is stored in the data storage memory 3 to set the setting information data, and the infrared signal detection process is completed.

The infrared signal detection process is executed by the other PLCC terminal apparatus 301*b*, 301*c* and 301*d* in a manner similar to that of the PLCC terminal apparatus 301*a*.

Figure 11:
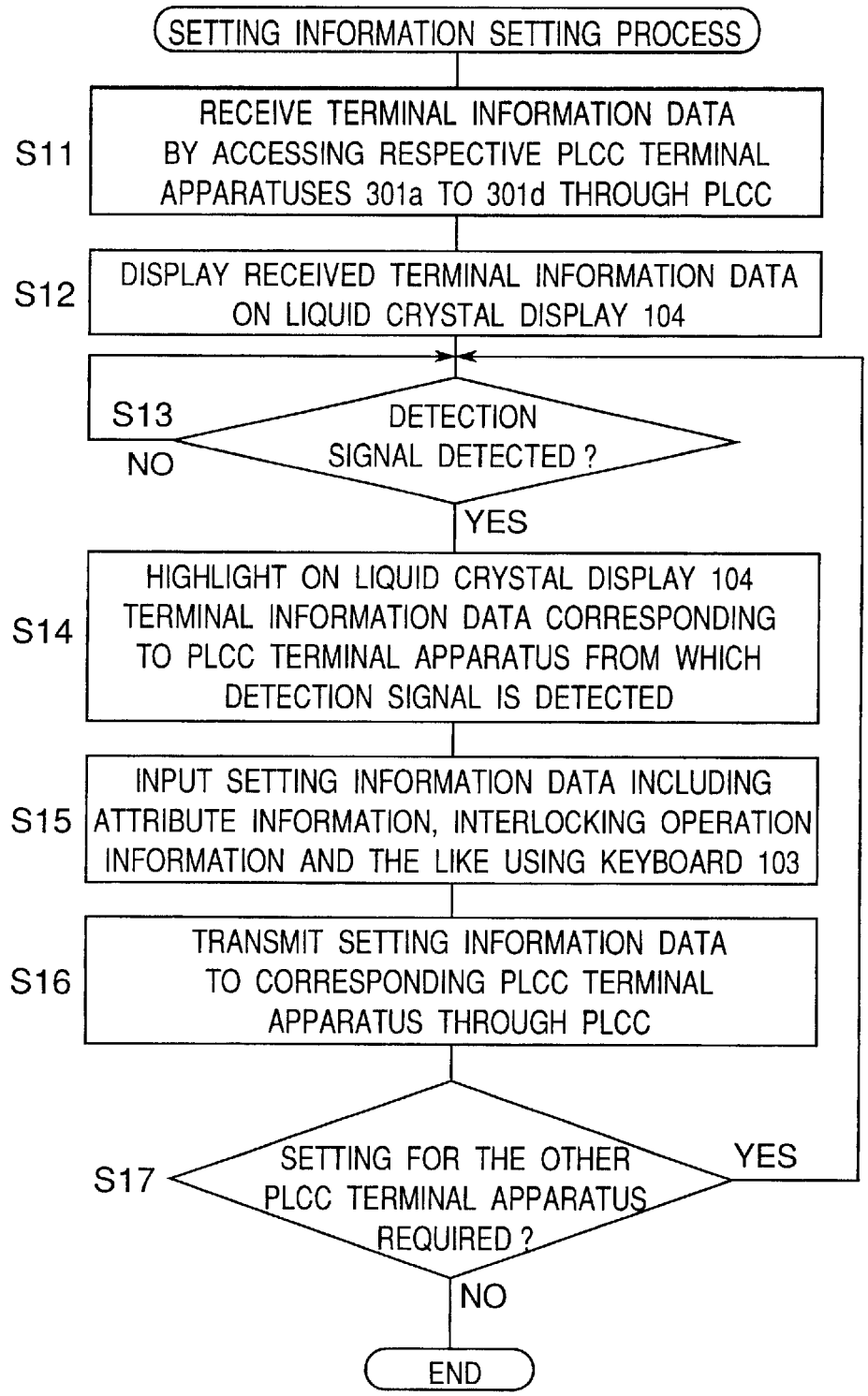
FIG. 11 is a flowchart showing a setting information setting process which is executed by a CPU 101 of the PLCC setting apparatus 200 shown in FIG. 9.

FIG. 11 is a flowchart showing a setting information setting process which is executed by the CPU 101 of the PLCC setting apparatus 200 shown in FIG. 9.

Referring to 11, first of all, the CPU 101 receives the above-mentioned terminal information data including terminal identification information and terminal attribute information by accessing respective PLCC terminal apparatuses 301*a* to 301*d* through PLCC at step S11, and then, displays the received terminal information data on the liquid crystal display 104 at step S12. Thereafter, it is judged at step S13 whether or not a detection signal is detected through PLCC, and if NO at step S13, the program flow repeats the process of step S13. On the other hand, if YES at step S13, the terminal information data corresponding to the PLCC terminal apparatus from which the detection signal is detected is highlighted on the liquid crystal display 104 at step S14, and then, the setting information data including attribute information, interlocking operation information and the like are inputted using the keyboard 103 at step S15. After the user confirms the same inputted setting information data and pushes on a transmission key of the keyboard 103, for example, the inputted setting information data is transmitted to the corresponding PLCC terminal apparatus through PLCC at step S16. Then it is judged at step S17 whether or not setting for the other PLCC terminal apparatus is required, and if YES at step S17, the program flow goes back to step S13. On the other hand, if NO at step S17, the setting information setting process is completed.

According to the second preferred embodiment, execution of the infrared signal detection process using an infrared signal shown in FIG. 10 and the setting information setting process shown in FIG. 11 leads to easily and certainly specifying the position of each of the PLCC terminal apparatuses 301a, 301b, 301c and 301d, namely, to easily and certainly specifying the relationship between terminal information data which is listed in a terminal table and each of the PLCC terminal apparatuses 301a, 301b, 301c and 301d which is practically installed.

Third Preferred Embodiment

Figure 12:
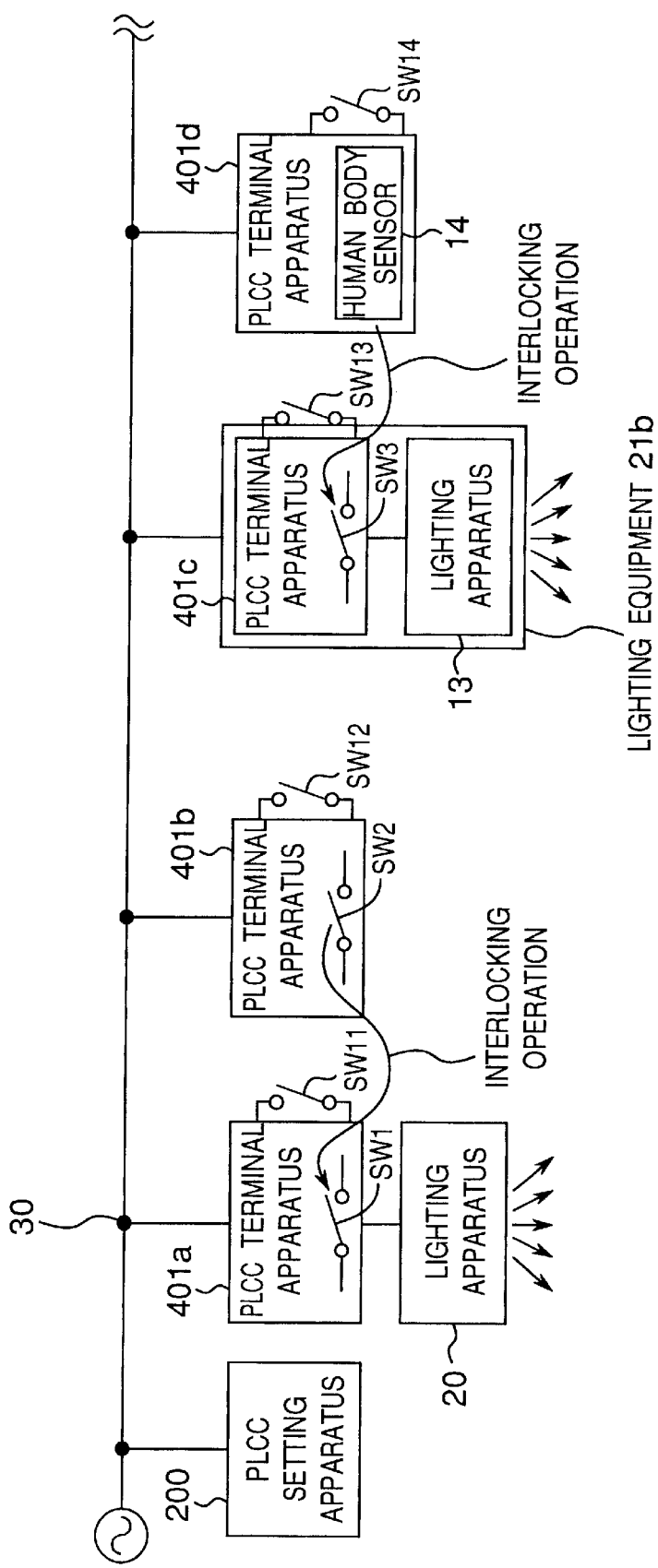
FIG. 12 is a schematic block diagram showing a configuration of an electric power line carrier communication system according to a third preferred embodiment of the present invention.

FIG. 12 is a schematic block diagram showing a configuration of an electric power line carrier communication system according to a third preferred embodiment of the present invention. As compared with the second preferred embodiment, the communication system of the third preferred embodiment is characterized in the followings:

(a) there is provided no infrared signal transmitter 310;

(b) a PLCC terminal apparatus 401a having an operating switch SW11 for inputting a predetermined ON/OFF input pattern (referred to as an ON/OFF pattern hereinafter) to specify the same PLCC terminal apparatus 401a is provided in stead of the PLCC terminal apparatus 301a having the infrared receiving section 5;

(c) a PLCC terminal apparatus 401b having an operating switch SW12 for inputting a predetermined ON/OFF pattern to specify the same PLCC terminal apparatus 401b is provided in stead of the PLCC terminal apparatus 301b having the infrared receiving section 5;

(d) a PLCC terminal apparatus 401c having an operating switch SW13 for inputting a predetermined ON/OFF pattern to specify the same PLCC terminal apparatus 401c is provided in stead of the PLCC terminal apparatus 301c having the infrared receiving section 5; and (e) a PLCC terminal apparatus 401d having an operating switch SW14 for inputting a predetermined ON/OFF pattern to specify the same PLCC terminal apparatus 401d is provided in stead of the PLCC terminal apparatus 301d having the infrared receiving section 5.

Figure 13:
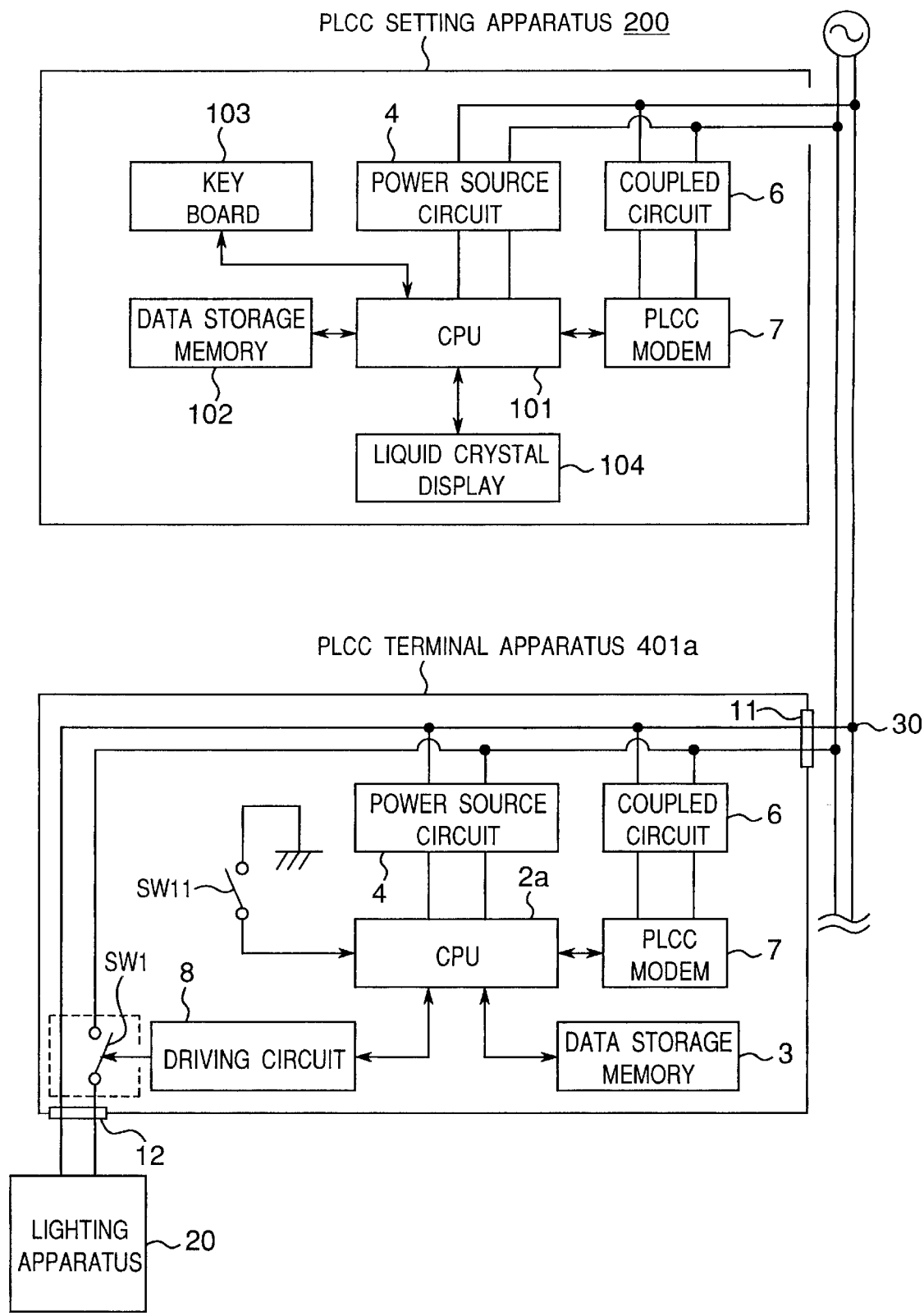
FIG. 13 is a schematic block diagram showing detailed configurations of a PLCC setting apparatus 200 and a PLCC terminal apparatus 401a shown in FIG. 12.

FIG. 13 is a schematic block diagram showing detailed configurations of the PLCC setting apparatus 200 and the PLCC terminal apparatus 401a shown in FIG. 12.

As apparent from a configuration of the PLCC terminal apparatus 401a shown in FIG. 13, the operating switch SW11 is provided in stead of the infrared receiving section 5. The user operates the operating switch SW11 so as to input the predetermined ON/OFF pattern, and then, the detection signal is transmitted from the PLCC terminal apparatus 401a through PLCC to the PLCC setting apparatus 200. It is to be noted that the PLCC terminal apparatuses 401b, 401c and 401d are constructed in a manner similar to that of the PLCC terminal apparatus 401a.

FIG. 14 is a flowchart showing an operating switch ON/OFF pattern detection process which is executed by the CPU 2a of the PLCC terminal apparatus 401a shown in FIG. 13.

Referring to FIG. 14, first of all, it is judged at step S21 whether or not an ON/OFF pattern is inputted using the operating switch SW11, and if NO at step S21, the CPU 2a repeats the process of step S21. On the other hand, if YES at step S21, it is judged at step S22 whether or not the inputted ON/OFF pattern coincides with the specified predetermined pattern. If NO at step S22, the program flow goes to step S29. On the other hand, if YES at step S22, a detection signal is transmitted through PLCC to the PLCC setting apparatus 200 at step S23, and then, the operation mode of the CPU 2a is transited from the PLCC receiving disabling mode to the PLCC receiving enabling mode at step S24. Then the CPU 2a waits in the PLCC receive enabling mode at step S25, and it is judged at step S26 whether or not setting information data is received from the PLCC setting apparatus 200 through the PLCC modem 7. If NO at step S26, it is judged at step S28 whether or not a predetermined time has been elapsed from the beginning of the PLCC receive enabling mode. If NO at step S28, the program flow goes back to step S25. On the other hand, if YES at step S28, the program flow goes to step S29, and then, the operation mode of the CPU 2a is transited from the PLCC receive enabling mode to the PLCC receive disabling mode, and then, the operating switch ON/OFF pattern detection process is completed. Further, if YES at step S26, the program flow goes to step S27, and then, the received setting information data is stored in the data storage memory 3 to set the setting information data, and the operating switch ON/OFF pattern detection process is completed.

The operating switch ON/OFF pattern detection process is executed by the other PLCC terminal apparatus 401b, 401c and 401d in a manner similar to that of the PLCC terminal apparatus 401a. Further, the setting information setting process is executed by the CPU 101 of the PLCC setting apparatus 200 in a manner similar to that of shown in FIG. 11.

According to the third preferred embodiment, execution of the operating switch ON/OFF detection process using each of the operating switch SW11 to SW14 shown in FIG. 14 and the setting information setting process shown in FIG. 11 leads to easily and certainly specifying the position of each of the PLCC terminal apparatuses 401a, 401b, 401c and 401d, namely, to easily and certainly specifying the relationship between terminal information data which is listed in a terminal table and each of the PLCC terminal apparatuses 401a, 401b, 401c and 401d which is practically installed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A setting apparatus for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the following:

(a) a first electric power line carrier communication terminal apparatus, provided between the electric power line of the commercial electric power source and an electric power load apparatus, and controlling an operation of said electric power load apparatus;

(b) a second electric power line carrier communication terminal apparatus, included in the electric power load apparatus, connected to the electric power line, and controlling an operation of said electric power load apparatus; and (c) a third electric power line carrier communication terminal apparatus, connected to the electric power line, and remotely performing control operation for one of said first and second electric power line carrier communication terminal apparatuses so as to be interlocked using the electric power line carrier communication means, wherein said setting apparatus comprises:

storage means for previously storing the setting information; and infrared communication means for transmitting the setting information stored in said storage means, directly to the electric power line carrier communication terminal apparatus using an infrared communication method.

2. The setting apparatus as claimed in claim 1, wherein the setting information further includes a control program for use in operating said electric power load apparatus using the control program, and wherein said setting apparatus further comprises input means for inputting the setting information.

3. The setting apparatus as claimed in claim 2, wherein said input means is an interface circuit capable of being connected to a personal computer.

4. The setting apparatus as claimed in claim 1, wherein said storage means is a removable storage medium.

5. A setting method for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the following:

(a) a first electric power line carrier communication terminal apparatus, provided between the electric power line of the commercial electric power source and an electric power load apparatus, and controlling an operation of said electric power load apparatus;

(b) a second electric power line carrier communication terminal apparatus, included in the electric power load apparatus, connected to the electric power line, and controlling an operation of said electric power load apparatus; and (c) a third electric power line carrier communication terminal apparatus, connected to the electric power line, and remotely performing control operation for one of said first and second electric power line carrier communication terminal apparatuses so as to be interlocked using the electric power line carrier communication means, wherein said setting method includes the steps of:

previously storing the setting information into storage means; and transmitting the setting information stored in said storage means, directly to said electric power line carrier communication terminal apparatus using an infrared communication method.

6. A setting apparatus for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the following:

(a) a first electric power line carrier communication terminal apparatus, provided between the electric power line of the commercial electric power source and an electric power load apparatus, and controlling an operation of said electric power load apparatus;

(b) a second electric power line carrier communication terminal apparatus, included in the electric power load apparatus, connected to the electric power line, and controlling an operation of said electric power load apparatus; and (c) a third electric power line carrier communication terminal apparatus, connected to the electric power line, and remotely performing control operation for one of said first and second electric power line carrier communication terminal apparatuses so as to be interlocked using the electric power line carrier communication means, wherein said setting apparatus comprises:

first receiving means for receiving terminal identification information and terminal attribute information of each of said electric power line carrier communication terminal apparatuses by performing communications with said electric power line carrier communication terminal apparatuses using said electric power line carrier communication means;

first display means for displaying the received terminal identification information and terminal attribute information of each of said electric power line carrier communication terminal apparatuses for each of said electric power line carrier communication terminal apparatuses;

second receiving means for receiving a detection signal including the terminal identification information transmitted from each of said electric power line carrier communication terminal apparatuses in response to a predetermined position specifying signal;

second display means for displaying the terminal identification information and terminal attribute information of an electric power line carrier communication terminal apparatus corresponding to the received detection signal;

input means for inputting setting information including attribute information and interlocking operation information of the electric power line carrier communication terminal apparatus which are displayed; and transmission setting means for setting the setting information into an electric power line carrier communication terminal apparatus corresponding to the detection signal by transmitting the inputted setting information to the electric power line carrier communication terminal apparatus corresponding to the detection signal using said electric power line carrier communication means.

7. The setting apparatus as claimed in claim 6,
wherein the position specifying signal is an infrared signal from an infrared signal transmitter.

8. The setting apparatus as claimed in claim 6,
wherein said position specifying signal is a pattern signal generated by turning on and off an operating switch.

9. A setting method for setting setting information including attribute information and interlocking operation information into an electric power line carrier communication terminal apparatus equipped with electric power line carrier communication means for performing electric power line carrier communication through an electric power line of a commercial electric power source, wherein the electric power line carrier communication terminal apparatus is one of the following:
  (a) a first electric power line carrier communication terminal apparatus, provided between the electric power line of the commercial electric power source and an electric power load apparatus, and controlling an operation of said electric power load apparatus;
  (b) a second electric power line carrier communication terminal apparatus, included in the electric power load apparatus, connected to the electric power line, and controlling an operation of said electric power load apparatus; and
  (c) a third electric power line carrier communication terminal apparatus, connected to the electric power line, and remotely performing control operation for one of said first and second electric power line carrier communication terminal apparatuses so as to be interlocked using the electric power line carrier communication means, wherein said setting method includes the steps of:
  receiving terminal identification information and terminal attribute information of each of said electric power line carrier communication terminal apparatuses by performing communications with said electric power line carrier communication terminal apparatuses using said electric power line carrier communication means;
  displaying the received terminal identification information and terminal attribute information of each of said electric power line carrier communication terminal apparatuses for each of said electric power line carrier communication terminal apparatuses;
  receiving a detection signal including the terminal identification information transmitted from each of said electric power line carrier communication terminal apparatuses in response to a predetermined position specifying signal;
  displaying the terminal identification information and terminal attribute information of an electric power line carrier communication terminal apparatus corresponding to the received detection signal;
  inputting setting information including attribute information and interlocking operation information of the electric power line carrier communication terminal apparatus which are displayed; and
  setting the setting information into an electric power line carrier communication terminal apparatus corresponding to the detection signal by transmitting the inputted setting information to the electric power line carrier communication terminal apparatus corresponding to the detection signal using said electric power line carrier communication means.

10. The setting method as claimed in claim 9,
wherein the position specifying signal is an infrared signal from an infrared signal transmitter.

11. The setting method as claimed in claim 9,
wherein said position specifying signal is a pattern signal generated by turning on and off an operating switch.

\* \* \* \* \*